Aug. 11, 1953  F. BAUER  2,648,807
MECHANICALLY CONTROLLABLE INDUCTION MACHINE
Filed Nov. 24, 1950  2 Sheets-Sheet 1

INVENTOR
Friedrich Bauer.
BY C. M. Avey
ATTORNEY

Aug. 11, 1953   F. BAUER   2,648,807
MECHANICALLY CONTROLLABLE INDUCTION MACHINE
Filed Nov. 24, 1950   2 Sheets-Sheet 2
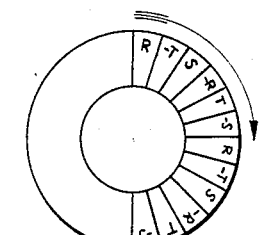
Fig.5
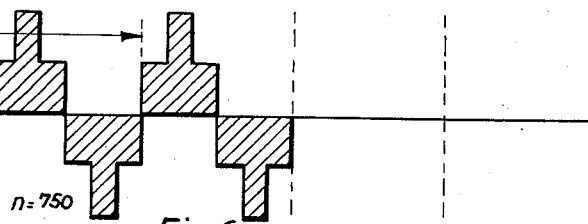
n=750   Fig.6
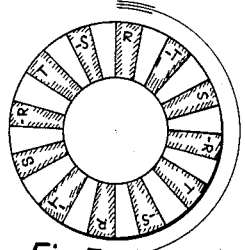
Fig.7
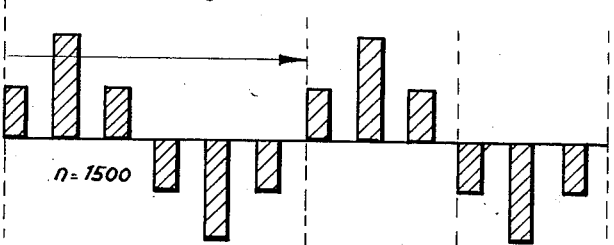
n=1500   Fig.8
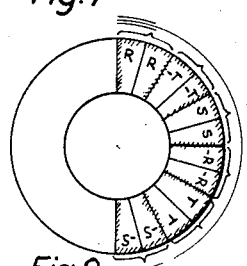
Fig.9
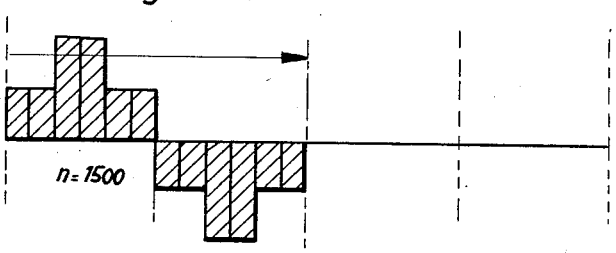
n=1500   Fig.10
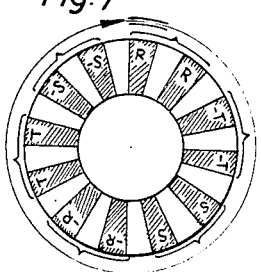
Fig.11
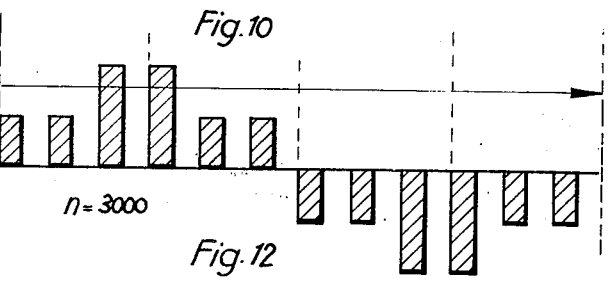
n=3000   Fig.12
INVENTOR
Friedrich Bauer.
BY
ATTORNEY Patented Aug. 11, 1953

2,648,807

UNITED STATES PATENT OFFICE 2,648,807

MECHANICALLY CONTROLLABLE INDUCTION MACHINE

Friedrich Bauer, Erlangen, Germany, assignor to Siemens - Schuckertwerke, Aktiengesellschaft, Berlin-Siemensstadt, Germany, a corporation of Germany Application November 24, 1950, Serial No. 197,241
In Germany December 1, 1948

6 Claims. (Cl. 318—214)

My invention relates to rotary-field machines for alternating current, particularly polyphase induction motors, with salient poles and concentrated pole windings, in which the peripherally aligned poles are peripherally displaceable relative to each other for controlling the rotary speed of the machine.

The known machines of this type have a poor efficiency, large losses due to upper harmonics, an excessive phase displacement between current and voltage, and relatively large space requirements for any given power rating. These deficiencies are to a considerable extent due to the fact that at any moment only a few individual peripheral areas of the rotor lie opposite the stator poles and that these areas are the more spaced apart from each other the farther the poles, for speed control, are shifted from each other.

It is therefore an object of my invention to devise displaceable-pole induction machines that avoid the above-mentioned deficiencies.

According to my invention, the occurrence of unfavorably large pole distances when increasing the tangential spacing of the poles is avoided by subdividing the stator pole for each phase and polarity into two or more partial poles with concentrated windings and to displace these partial poles from each other when changing the pole distances. In this manner the increase in distance between the poles of respectively different phases is accompanied by a peripheral widening of the partial poles appertaining to the individual. At a result, any occurring higher harmonics are largely suppressed, or the order number of the harmonics is favorably changed as regards the development of torque in comparison with single-piece poles.

Detrimental harmonics can also be reduced by applying pole arrangements which produce a rotating field similar to that of the conventional distributed windings. To this end, and in accordance with another feature of the invention, the partial poles of the individual phases are correspondingly intermixed, or at least some of them are each equipped with two concentrated windings connected to respectively different phases in such a circuit connection that for each phase, as a whole, the voltages of the partial pole geometrically add up to a resultant equal to the phase voltage.

In machines according to the invention, the range of speed control can be enlarged by selectively switching the poles or partial poles between different multi-speed circuit connections. This pole switching in such machines secures a coarse speed control comparable with that of multi-speed polyphase motors with distributed and subdivided windings, while the pole distance variation affords a fine regulation within the coarse speed steps. Consequently, a continuous and gradual regulation over a large total range of speeds can thus be achieved.

The foregoing and other features of the invention will be apparent from the following description of the embodiments of the invention exemplified by the drawings.

Fig. 1 shows schematically a side view of a three-phase induction motor with displaceable poles, Fig. 2 a peripheral development of the same motor with the poles set for almost minimum peripheral spacing, while Fig. 3 shows a similar development of the same motor with the poles set at a larger spacing, and Fig. 4 shows an example of a circuit connection applicable with such a motor.

Fig. 5 is a schematical axial view of a motor according to Figs. 1 to 3 for a given pole connection and with minimum spacing between the poles, the corresponding field distribution being typically represented in the coordinate diagram of Fig. 6; Fig. 7 represents a similar axial view of the same motor with maximum pole spacing and Fig. 8 a coordinate diagram of a corresponding field distribution; Fig. 9 is another schematic axial view relating to the same motor but a different pole connection for doubled speed while Fig. 10 is a diagram of a corresponding field distribution; and Figs. 11 and 12 are respectively an axial view and a field distribution diagram for the motor and pole circuit connections of Figs. 9 and 10 but relating to maximum spacing between the displaceable poles.

Figures 1, 2:
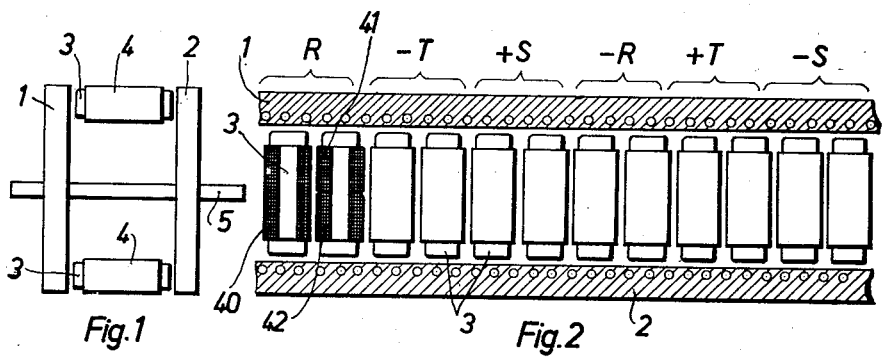
Figures 3, 4:
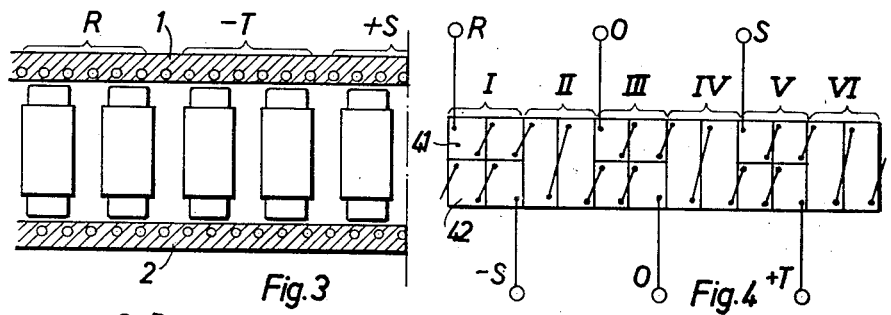

The machine according to Figs. 1 to 3 is designed as a three-phase induction motor. Its rotor is composed of two coaxial and rigidly interconnected members 1 and 2. The stator has a plurality of magnet cores 3 equipped with concentrated windings 4. The rotor disks 1 and 2 have respective cage windings and are mounted on a common shaft 5.

As apparent from the peripheral development of Fig. 2, the motor has a total of twelve solenoid magnets which are sequentially and in pairs connected to the three phases R, S, T with the relative polarities +R, −T, +S, −R, +T, −S. The magnetic flux of each stator magnet extends through an iron core 3 and across one rotor air gap through the disk 1, the iron core 3 of another magnet, the other air gap and the disk 2 to return through the latter air gap to the first-mentioned magnet core. In this embodiment, therefore, each phase pole comprises two partial poles with respective concentrated windings.

The poles are tangentially displaceable from one another. Thus in Fig. 2 all partial poles are positioned close to one another so that the travelling speed of the rotating field is a minimum and the rotor periphery is only partially covered by the totality of magnet pole faces. In order to increase the motor speed, the individual poles and partial poles are displaced away from one another, for instance, to the mutual positions shown in Fig. 3. This increases the peripheral coverage and the travelling speed of the rotating field, thus increasing the speed of the rotor. An excessive increase in mutual spacing between the poles may cause the field wave to develop higher harmonics which are no longer sufficiently suppressed by the cage winding of the rotor and hence tend to reduce the torque and efficiency. However, the loss thus incurred is permissible for many operating conditions. Besides, such detrimental effects are the smaller the more the poles of each phase are subdivided into partial poles because with such a subdivision an increase in pole spacing is accompanied by a corresponding peripheral separation of the individual partial poles within the individual phases, thus avoiding the formation of large pole gaps.

In order to achieve the effect of a distributed winding as regards the development of a rotating field, the partial poles or some of them may each be given two concentrated windings 41, 42 (Fig. 2) instead of only the one winding 40. These part windings 41, 42 are electrically connected to different phases, for instance, in the manner shown in Fig. 4. According to Fig. 4, the subdivided pole coils of coil group I are connected in the sense +R and −S, respectively. The coils of group II are all connected in the sense +R, those of group III in the sense +R and −T, respectively. The coils of group IV are all connected in the sense −T, those of group V in the sense +S and −T, respectively, and the coils of group VI are all connected in the sense −S, etc. The resultant rotating field has twelve axes and hence has a high degree of uniformity. All windings and partial windings connected to the phase R and appertaining to groups I to III are, for instance, series connected. The voltages of the R windings in groups I and III add up to a resultant voltage in the direction of the phase voltage. Such and similar means suffice to obtain a very uniform rotating field and hence secure a good efficiency. The shifting apart of the individual partial poles and poles cannot lead to more unfavorable conditions than with a motor having a distributed winding because the mutually separated partial poles correspond more or less to the stator teeth adjacent to the conductor-containing slots of a conventional, distributed-winding arrangement. Even with a larger spacing, the conditions cannot become more unfavorable than with a conventional three-phase motor with abnormally large gaps between the stator teeth.

Instead of giving the individual partial poles several windings, a similar effect can also be achieved by correspondingly intermixing the partial poles of different phases. For instance, in the group I according to Fig. 4, the first partial pole may be given a winding in the sense +R, and the second partial pole may be given a winding in the sense −S. Then the windings of the group II would all be connected in the sense +R, the first partial pole in the group III would have a winding connected in the sense −T, while the second partial pole of group III would be connected in the sense +R, etc. Since with such an arrangement the fluxes of the individual partial poles sufficiently stray into each other, disturbing higher harmonics can be kept within acceptable limits.

For changing the distance between the poles and partial poles, any suitable mechanisms are applicable such as crank, slider, lever or screw drives, for instance, lever mechanisms having scissor-type linkages as exemplified by Figs. 15, 16 and described in a later place. Lost motion between the individual parts of such mechanisms should be compensated as much as possible with the customary means in order to secure a safe seating of the poles in all positions and to prevent humming.

The control performance of the above-descibed motor will be understood from the distribution diagrams of Figs. 5 to 12.

According to Figs. 5 and 7, the twelve partial poles of the motor are connected in the sense +R, −T, +S, −T, etc. If the poles are positioned closely adjacent to one another as shown in Fig. 5, the resulting field distribution is essentially in accordance with Fig. 6. When the individual poles are moved apart from one another as shown in Fig. 7, the field distribution is substantially in accordance with Fig. 8. If the partial poles are energized in the sense +R, +R, −T, −T, +S, +S, etc., as indicated in Figs. 9 and 11, then a narrow arrangement of the poles according to Fig. 9 results in a field distribution as typified by Fig. 10, while at a maximum spacing of the poles according to Fig. 11 a field distribution as shown in Fig. 12 is effective. The field distributions according to Figs. 6, 8, 10 and 12 correspond to no-load speeds of 750, 1500, 1500, 3000 R. P. M., respectively. Consequently, a coarse selective adjustment over two speed ranges is obtained by selective pole switching, i. e. by switching the phase connections between those corresponding to Figs. 5 and 9. All intermediate speeds can then be adjusted by varying the pole spacing. In this manner a continuously controllable speed range from 750 to 3000 R. P. M. is obtained.

Figure 13:
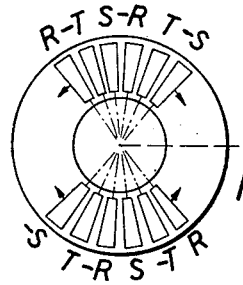
Figs. 13 and 14 show schematic axial view of another embodiment of an induction machine with respectively different adjustments of the poles.
Figure 14:
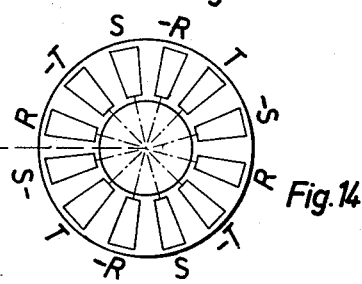

As shown in Figs. 13 and 14, the partial poles may be arranged in two diametrically opposite groups. Each two opposite partial poles are rigidly interconnected to move simultaneously. As a result, the radial magnetic forces occurring with cylindrical rotors are balanced. Fig. 13 shows the poles close to one another for low speed, and Fig. 14 the same arrangement with maximum pole spacing for high speed.

Figure 15:
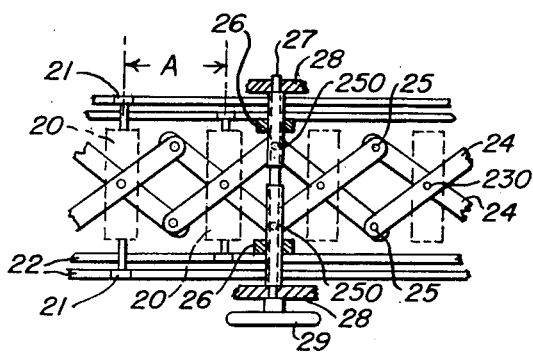
Fig. 15 is a schematic view, shown in developed form, of a machine with an appertaining mechanism for selectively controlling the peripheral pole spacing.
Figure 16:
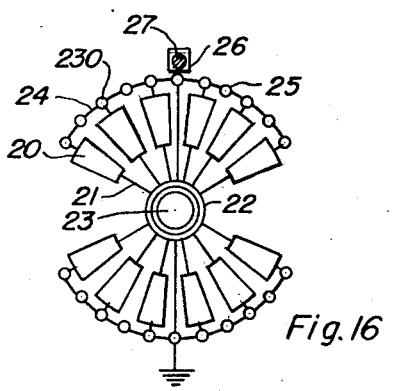
Fig. 16 is a schematic axial view of the same machine and control mechanism.

Fig. 15 shows schematically a control mechanism with scissor-linked levers arranged around part of the periphery in the manner apparent from Fig. 16. The individual poles 20 of the machine are attached to radial arms 21 whose pivot hubs 22 are mounted in coaxial relation to the rotor shaft. Mounted on the radially outer side of each pole is a pivot pin 230. Two double-armed levers 24 are rotatable about each of these pivot pins. The ends of the levers 24 are interlinked by pins 25. Two of these pins, denoted by 250, are connected to screw nuts 26 with opposingly directed screw threads, respectively. A spindle 27, revolvable in bearings 28, has two corresponding screw threads in engagement with the respective nuts 26 and carries a control wheel 29. The tangential distances A between the poles are varied by turning the control wheel 29.

A control mechanism of the type just described, while shown in conjunction with a machine according to Figs. 13, 14 is, of course, also applicable with machines according to Figs. 1 to 3.

The invention permits the manufacture of rotating-field motors whose speed is mechanically controllable by variation in pole spacing and which secure a satisfactory efficiency equivalent or better than that of the conventional induction motors in cases where the desired rotary speed requires operating the conventional motors under greatly increased slip conditions or with the aid of additional frequency-changing accessories. Motors according to the invention also permit any speed variations due to changes in load to be kept within considerably smaller limits than in conventional motors having a speed regulated by slip variation. This is due to the fact that motors according to the invention have always a definite no-load speed for each selected speed adjustment, while with conventional motors, when changing the speed by a change in slip, the no-load speed is always the same. Motors according to the invention are, therefore, advantageously applicable wherever a good regulation is desired, for instance, in paper and textile fabricating machinery, hoists, railroad drives, etc. Of course, machines according to the invention can also be used as generators in conjunction with corresponding frequency control means.

In addition, machines according to the invention offer all known advantages of motors with concentrated windings and salient poles such as: simplified manufacture of the windings—for instance, on coil winding machines, simplified assembly work, an excellent insulation especially in machines for high voltages, applicability for motors of smallest power output, elimination of complicated punching dies, good sheet metal utilization, also the possibility of repair by replacement of defective windings, and avoidance of exacting requirements as regards electric and mechanical strength of the insulation required for the coil wires.

I claim:

1. A polyphase induction machine, comprising a rotor and a plurality of phase poles corresponding to the respective machine phases, said phase poles being displaceable relative to one another along the rotor periphery between narrow-spaced and maximum-spaced mutual positions, each of said phase poles being composed of a plurality of peripherally spaced partial poles all disposed in a peripheral alignment, said partial poles having respective concentrated windings and being displaceable relative to one another conjointly with said phase poles so that the mutual peripheral spacing of said partial poles changes with a corresponding displacement of said phase poles.

2. In a machine according to claim 1, said partial poles of each phase pole being intermixed and having a resultant rotating field substantially of the distributed-winding type.

3. In a machine according to claim 1, at least some of said individual partial poles having a plurality of said concentrated windings connected to respectively different phases to produce a more uniformly rotating resultant field.

4. A polyphase induction machine, comprising a rotor and having for each phase a plurality of field pole structures and respective concentrated pole windings selectively switchable between a plurality of connections for respectively different coarse speed steps, said pole structures being peripherally aligned and being peripherally displaceable between mutually narrow-spaced and wide-spaced positions for speed variation between said steps.

5. A polyphase induction machine, comprising a rotor and a plurality of phase poles corresponding to the respective mahine phases, said phase poles being displaceable relative to one another along the rotor periphery between narrow-spaced and maximum-spaced mutual positions, each of said phase poles being composed of a plurality of peripherally spaced partial poles all disposed in a peripheral alignment, said partial poles having respective concentrated windings and being displaceable relative to one another conjointly with said phase poles so that the mutual peripheral spacing of said partial poles changes with a corresponding displacement of said phase poles.

6. An alternating-current rotating-field machine, comprising a rotor, a group of peripherally sequential pole structures and concentrated windings on said pole structures, said pole structures being displaceable relative to one another peripherally along said rotor and extending in totality over only part of the rotor periphery at minimum mutual tangential spacings of said pole structures, a multiple scissor-type mechanism having a plurality of scissor pivots connected with said respective pole structures for evenly varying their respective mutual spacing, and a movable control member engaging said mechanism for actuating said mechanism.

FRIEDRICH BAUER.

References Cited in the file of this patent

UNITED STATES PATENTS

| Number | Name | Date |
|---|---|---|
| 1,514,474 | Stewart | Nov. 4, 1924 |
| 1,559,920 | Stewart | Nov. 3, 1925 |
| 2,470,767 | Ellis | May 24, 1945 |
| 2,500,365 | Laceulle | Mar. 14, 1950 |